No. 854,442. PATENTED MAY 21, 1907.
B. R. VAN KIRK.
ELECTRIC MOTOR TRUCK.
APPLICATION FILED NOV. 30, 1906.

2 SHEETS—SHEET 1.

Witnesses:—

Inventor
Benjamin R. Van Kirk.
by his Attorneys

No. 854,442. PATENTED MAY 21, 1907.
B. R. VAN KIRK.
ELECTRIC MOTOR TRUCK.
APPLICATION FILED NOV. 30, 1906.

2 SHEETS—SHEET 2.

Witnesses:—

Inventor.—
Benjamin R. Van Kirk
by his Attorneys,

UNITED STATES PATENT OFFICE.

BENJAMIN R. VAN KIRK, OF PHILADELPHIA, PENNSYLVANIA, ASSIGNOR TO BURNHAM, WILLIAMS & COMPANY, OF PHILADELPHIA, PENNSYLVANIA, A FIRM.

ELECTRIC-MOTOR TRUCK.

No. 854,442.   Specification of Letters Patent.   Patented May 21, 1907.

Application filed November 30, 1906. Serial No. 345,726.

*To all whom it may concern:*

Be it known that I, BENJAMIN R. VAN KIRK, a citizen of the United States, residing in Philadelphia, Pennsylvania, have invented certain Improvements in Electric-Motor Trucks, of which the following is a specification.

My invention relates to certain improvements in electric motor trucks in which the motors are carried by the trucks and extend beyond the wheel base of the truck.

The main objects of my invention are to relieve the outer portion of truck frame from the support of the motors, and also to decrease the tilting effect on the frame due to motor torque, by attaching the outer portion of the motors to equalizing beams which rest upon the axle boxes.

A further object of the invention is to so construct the equalizing beams that the traction of both pairs of wheels of the truck will be about the same.

Figure 1:
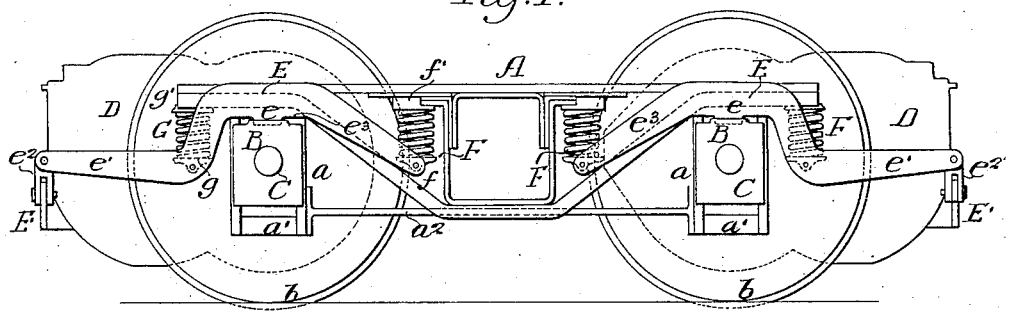
Figure 2:
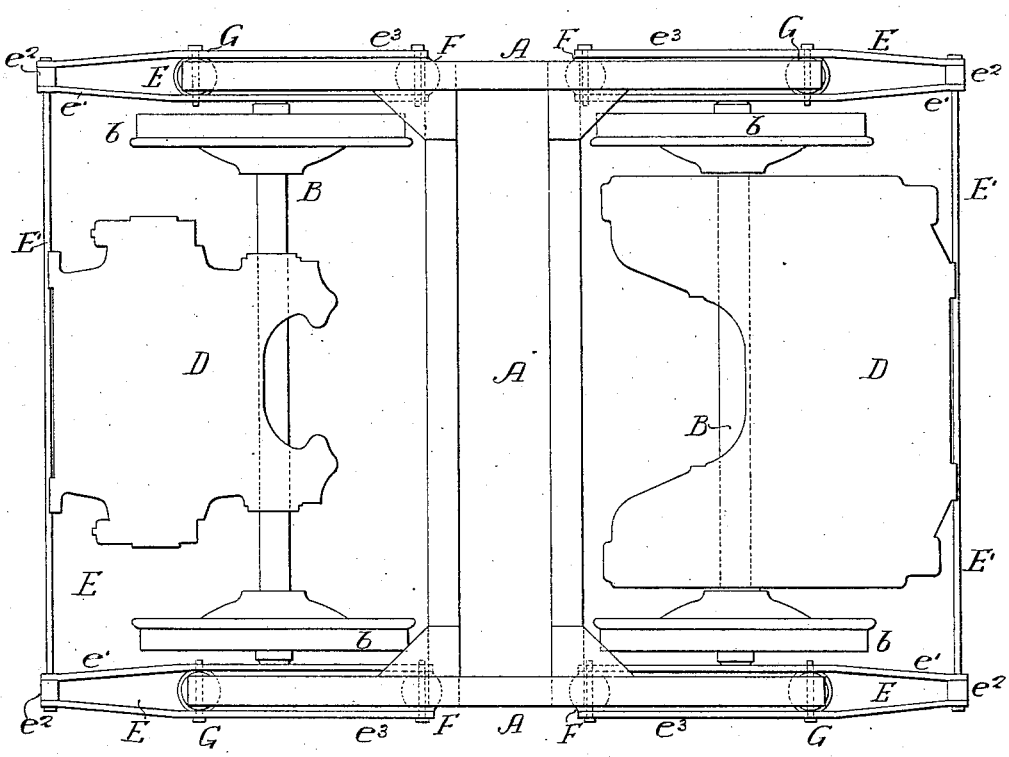
Figure 3:
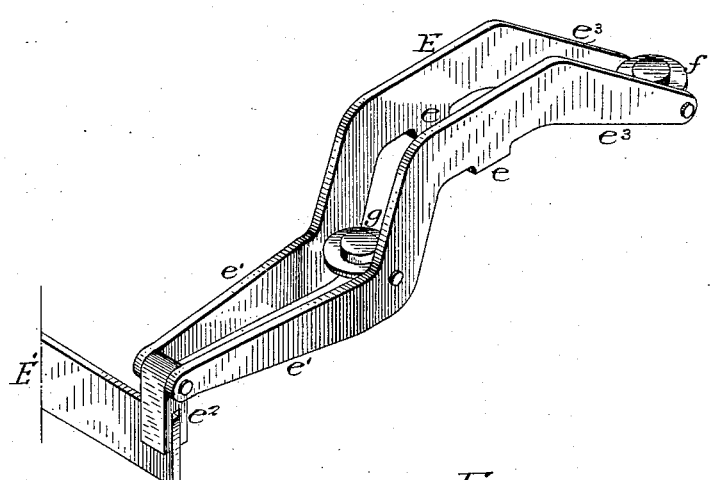
Figure 4:
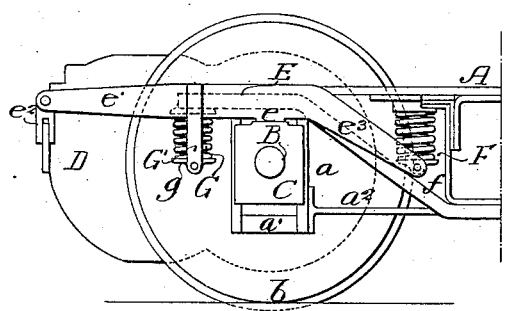

In the accompanying drawing:—Figure 1, is a side view of my improved truck; Fig. 2, is a plan view; Fig. 3, is a perspective of one pair of equalizing beams, and Fig. 4, is a view of a modification.

A is the frame of the truck which may be of any type desired, $a$, $a$ are pedestals, in the present instance of wrought metal and bent at the upper ends as shown and spaced by a block $a'$, the two sets of pedestals are connected together by the tie rod $a^2$.

B, B are the axles, $b$, $b$ are the wheels. The axles are mounted in the boxes C adapted to the pedestals $a$, $a$.

D, D are the electric motor casings mounted in the usual manner on the axles B, B the motors being geared to the axles.

It will be noticed that each motor extends beyond the wheel base of the truck and ordinarily these overhanging portions are hung from the frame of the truck.

In carrying out my invention I mount two sets of equalizing beams E, E on each side of the truck. The beams of each set are spaced a given distance apart and the side members of the frame A of the truck extend between the beams, as shown clearly in Fig. 2.

The beams extend over the boxes as illustrated and the portions $e$ rest directly upon the boxes. The arms $e'$ extend outward and are coupled by links $e^2$ to the cross bars E'; these cross bars support the overhanging portions of the motor casing. The casing can be hung to the bars or attached thereto in any suitable manner.

The arms $e^3$ of the beams extend toward the center of the truck frame and carry the spring seats $f$ which support the springs F which in turn rest against the seats $f'$ on the frame A. The seats $g$ are carried by the arms $e'$ and support the springs G which rest against the seats $g'$ on the frame A, so that there is a spring on each side of each box, as indicated clearly in Fig. 1.

It will be understood that I may use a single beam for each box instead of a pair of beams, as shown, but I prefer to use the beams in pairs as it makes a more substantial construction and allows for the proper support of the spring seats. In this construction it will be noticed that the side members of the frame A do not extend beyond the seats $g'$ of the springs G, thus considerably reducing the overhang of the side members of the truck frame.

By spacing the springs as indicated in Fig. 1, so that the spring G is nearer the box than the spring E, I equalize the pressure upon the beams on each side of the box, as the weight of the motor case is considered in locating the springs F and G. By this arrangement, I also avoid to a great extent the effect of the tendency of the torque of the motors to relieve the pressure on one pair of wheels and increase it on the other, as the equalizing beams transfer this tendency to less effective points. This causes a more nearly equal distribution of the weight upon the rails and consequent increase in available adhesion and tractive power.

In Fig. 2, the end $e'$ of each equalizing beam is bent, but in Fig. 4, I have shown it extending straight from the box and a strap G' used to support the spring G.

I claim:—

1. The combination in a truck, of a frame, axle boxes carried by the frame, axles mounted in the said boxes, a motor mounted on one of said axles and extending beyond the wheel base of the truck, an equalizing beam on each side of the truck, each beam being mounted on an axle box, one arm of each beam supporting the overhanging portion of the motor, and a spring for counterbalancing the motor, substantially as described.

2. The combination in a car truck, of a frame, boxes in the frame, axles mounted in the boxes, a motor carried by each axle, each motor extending beyond the wheel base of the truck, one in one direction and the other in the opposite direction, an equalizing beam mounted on each side of the truck, the beams supporting the overhanging portions of the motors mounted on the axles, a counterbalancing spring mounted between one arm of the lever and the frame of the truck, the levers supporting the two motors being independently mounted on the truck frame, substantially as described.

3. The combination in a car truck, of a frame, boxes mounted in the frame, axles mounted in the boxes, a motor carried on one of the axles and extending beyond the wheel base, two equalizing beams one on each side of the frame and mounted on the boxes carried by the axles supporting the motor, a cross bar extending from one beam to the other, the overhanging portion of the motor being carried by said bar, and a spring between each beam and the frame on the opposite side of the box, substantially as described.

4. The combination in a car truck, of a frame, boxes in the frame, axles mounted in the boxes, a motor casing carried by one of said axles and overhanging the wheel base of the truck, beams resting on the boxes, a spring on each side of the box mounted between the beam and the frame of the truck, the overhanging portion of the motor being supported by said beams, substantially as described.

5. The combination in a car truck, of a frame, axle boxes, axles mounted in the boxes, wheels on the axles, a motor casing carried by each axle, each motor casing extending beyond the wheel base, two sets of equalizing beams, one set mounted on the boxes of one axle and the other set mounted on the boxes of the other axle, the overhanging portions of the motor being carried by their respective beams, and springs on each side of the boxes between the beams and the frame, the spring on the motor side being nearer the box than the spring on the opposite side, substantially as described.

6. The combination of a car truck, a frame, axle boxes in the frame, axles mounted in the boxes, a motor mounted on one of the axles and extending beyond the wheel base of the truck, a pair of beams on each side of the truck, the beams of each pair arranged side by side and spaced apart, the frame extending between the beams of each pair, a bar extending across the truck and attached to each pair of beams, seats carried by each pair of beams, and springs mounted between the seats and the frame, the overhanging portion of the motor being carried by the cross bar, substantially as described.

In testimony whereof, I have signed my name to this specification, in the presence of two subscribing witnesses.

BENJAMIN R. VAN KIRK.

Witnesses:
   JOS. H. KLEIN,
   WM. A. BARR.